United States Patent
McMillin

[15] 3,701,338
[45] Oct. 31, 1972

[54] OYSTER SETTING METHOD AND APPARATUS

[72] Inventor: David C. McMillin, Shelton, Wash.
[73] Assignee: Olympia Oyster Company, Shelton, Wash.
[22] Filed: Dec. 10, 1970
[21] Appl. No.: 96,905

[52] U.S. Cl.................................................119/4
[51] Int. Cl................................................A01k 61/00
[58] Field of Search.........................................119/4

[56] References Cited

UNITED STATES PATENTS

| | | | |
|---|---|---|---|
| 3,017,857 | 1/1962 | Munz | 119/4 |
| 3,526,209 | 9/1970 | Budge | 119/4 |
| 3,196,833 | 7/1965 | Glancy | 119/4 |
| 1,933,950 | 11/1933 | Wells | 119/4 |
| 2,853,049 | 9/1958 | Glancy | 119/4 |
| 3,572,292 | 3/1971 | Quayle et al | 119/4 |

Primary Examiner—Aldrich F. Medbery
Attorney—Seed, Berry & Dowrey

[57] ABSTRACT

Oyster shells are fed in bulk from a storage hopper and allowed to free-fall into a setting tank containing liquid and free-swimming oyster larvae. The shells land on their convex side on a moving open-mesh conveyer. The conveyer transports the shells through the liquid and out of the tank. As the shells are passed through the liquid the larvae set on the convex undersides. As the shells leave the setting tanks with the larvae attached they are utilized in open-mesh bags and then placed in a recovery tank for a few days until suitably conditioned for transporting and placing in natural oyster beds.

7 Claims, 2 Drawing Figures

PATENTED OCT 31 1972 3,701,338

INVENTOR.
DAVID C. MC MILLIN

BY
ATTORNEYS

OYSTER SETTING METHOD AND APPARATUS

BACKGROUND OF THE INVENTION

1. Field of the Invention

This invention relates to the commercial production of seed oysters.

2. Description of the Prior Art

For a period of time oyster larvae are free-swimming and attach themselves or set on cultching material such as rocks, sticks, and especially previously harvested oyster shells. Oyster shells are the primary source of cultching material because of their good quality, affinity to the larvae, and abundance in the oyster growing regions.

The prior art cultching technique, that is, getting the larvae to set on oyster shells, was to unitize the shells either by stringing them on a wire or bundling them in an openmesh sack. Unitizing is defined as collecting or gathering the shells in a transportable container. The string or sack is then immersed in the water and exposed to the swimming larvae. In using this technique, the distribution of larvae on each shell was nut uniform causing overcrowding, and precluded proper access to the available food in the water. The problem was particularly severe when a high concentration of larvae were in the water as is the case when cultching is done in tanks with laboratory or other artificially produced larvae.

SUMMARY OF THE INVENTION

Applicant has discovered, contrary to the heretofore customary practice of unitizing the oyster shells prior to exposure to the swimming larvae, that a better set, e.g., a better distribution of larvae among a large quantity of shells and a better distribution of larvae on each shell is obtainable by unitizing after the larvae have set. It is thus an object, of this invention, to provide a commercial method and apparatus for obtaining a high quantity -- high quality set of oyster larvae on oyster shells.

It is the object of this invention, to obtain a set of oyster larvae on oyster shells at a low-cost.

It is an object of this invention, to obtain a consistent set of oyster larvae on oyster shells and to obtain the set on the convex side of the shells.

Basically the method of this invention comprises feeding the oyster shells in bulk into a liquid containing a high concentration of free-swimming oyster larvae. In the preferred form, the shells are permitted to free-fall through the liquid a distance sufficient to enable them to come to rest with the convex side of the shell down. Next the shells are moved through the liquid and exposed to the free-swimming larvae for a sufficient length of time to obtain a desired set. Once the set has occurred the oyster seed is unitized and stored or vice versa in a recovery liquid before being placed on their natural fattening beds.

The preferred apparatus employs an inclined conveyer movable through a tank of liquid containing the free-swimming larvae. The shells are permitted to free-fall into the tank to the lower end of the conveyer which is spaced sufficiently below the surface of the liquid to enable the shells to come to rest on the conveyer with their convex sides down. The conveyer is moved slowly through the liquid to obtain a proper set and the oyster seed is then unitized preferably at the end of the conveyor prior to being placed in a recovery liquid in a separate tank.

DESCRIPTION OF THE PREFERRED METHOD OF APPARATUS

Figure 1:
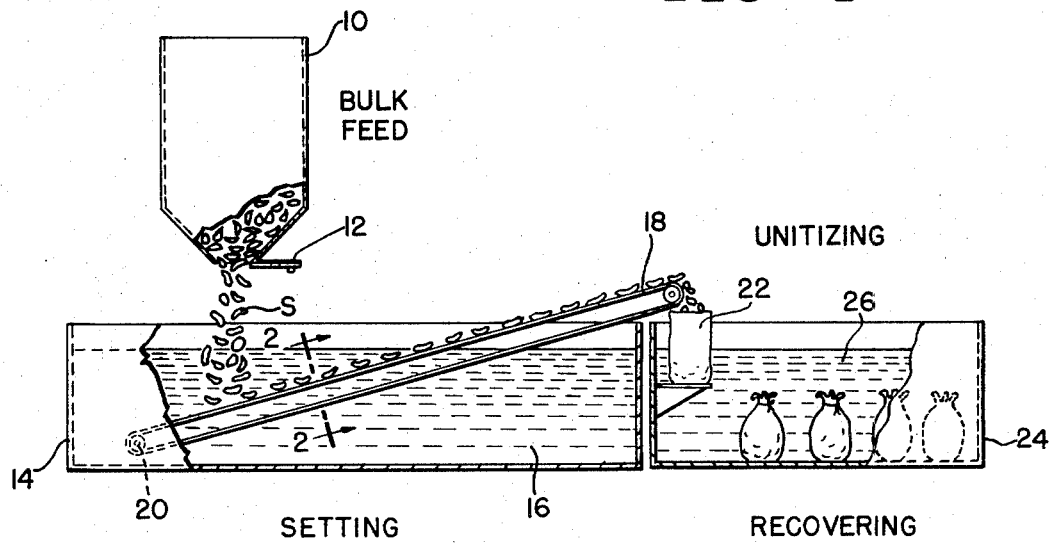
FIG. 1 shows a preferred form of apparatus suitable for carrying out the method of the invention.

The apparatus suitable for carrying out the method includes a hopper 10 having a discharge gate 12 for controlling the flow of bulk oyster shells discharged therefrom. The hopper is positioned over the end of a setting tank 14. The tank contains a setting liquid 16 preferably having a high concentration of free-swimming oyster larvae. The oyster larvae may be produced at the site of the cultching operation or may be produced at a remote location and shipped to the cultching location. The liquid can be controlled in temperature, salinity concentration, purity, etc., preferably, however, salt water at the location of the oyster growing region is directly pumped into the tank 14 and used as the setting liquid with generally only the temperature control necessary to obtain the optimum setting time. Preferably the water temperature in the setting tank is between 72°–80°F with the preferred exposure time of each shell in the liquid falling within the range of 5 – 15 minutes.

Oyster survival is best when the set is on the convex side of the shells. In order to obtain this set consistently, characteristics of the shells and larvae are uniquely combined. First, free-swimming oyster larvae generally set only on the underside of the shells. Second, oyster shells because of their concave-convex shape will normally assume a convex-side down position when free-falling in water. In this invention the shells are permitted to free-fall through the liquid to the lower end of the open-mesh conveyer 18 a sufficient distance to allow the shells to land convex-side down on the conveyer. Thus by positioning all of the shells in a convex-down position it is possible to obtain most of the set on the desired convex-side.

The conveyer 18 is preferably open-mesh to allow the free-swimming larvae access to the entire convex-side of the shell. The conveyer is entrained around rollers 20 and powered in a conventional manner to carry the shells out of the tank 14 where they are unitized by gathering them in open-mesh sacks 22. The unitized oyster seeds are then placed in a recovering tank 24. The recovering tank includes a liquid either pumped directly from the region in the oyster growing area or artificially controlled as in the same manner as the setting liquid 16. Preferably the water in the recovering tank is kept at a temperature within the range 60°–72°F with the shells being held in the tank for between 4–5 days.

Finally the unitized oyster seed is removed from the recovering tank by conventional techniques and re-deposited on the fattening beds in their natural habitat.

Figure 2:
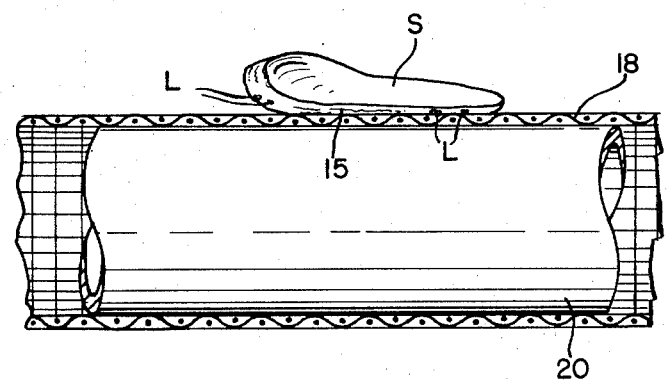
FIG. 2 is an enlarged section taken along the line 2—2 of FIG. 1 illustrating the desired position of the shells on the conveyor and the general location of the oyster larvae attached to the shell.

FIG. 2 demonstrates a typical shell S having a convex-underside 15 with larvae L attached thereon. Obviously the exact location and number of larvae setting on a particular shell varies; however, by maintaining the temperature of the setting water (and thus the activity level of the larvae) and maintaining the time in the tank, an average number can be realized. Since the entire convex underside 15 is exposed to the free-swimming larvae a distribution over a greater area of the individual shell is achieved. As a result the larvae have more room to grow and more access to their food source in the water.

The method of the invention is broadly to feed ununitized oyster shells into a liquid containing free-swimming oyster larvae. After exposure for sufficient time to obtain a desired set the seed oysters are unitized and stored in a recovering liquid. In the alternative, unitizing can take place after the recovering period using apparatus similar to that used in the setting operation. In a preferred form of the method the shells are given sufficient free-falling distance through the liquid to come to rest with their convexsides down.

While the preferred form of method and apparatus have been illustrated and described, it should be understood that modifications and additions will be apparant to one skill in the art without departing from principles of the invention. It is to be understood, therefore, that the invention is not to be limited by the specific method and apparatus described but only by the proper interpretation of the claims appended hereto.

The embodiments of the invention in which an exclusive property or privilege is claimed are defined as follows:

1. The method of setting oyster larvae on shells or other cup-like cultching material comprising:
   dispensing a flow of individual shells from a supply source,
   providing a tank containing a liquid and free-swimming oyster larvae and a conveyor passing through said liquid,
   permitting the dispensed shells to fall freely and be immersed in the liquid onto said conveyor,
   holding the immersed shells in the liquid for a time sufficient to obtain a set of larvae on the shells,
   transferring the shells with their set to a recovery area,
   holding the shells with their set in the recovery area for a time sufficient to reach young maturity,
   removing the shells with their set from the recovery area and depositing them in their natural habitat, and
   gathering the shells with their set in easily transportable quantities into containers for ease of transportation prior to depositing them in their natural habitat.

2. The method of claim 1, said gathering step occurring prior to the step of transferring the shells and set to the recovery area.

3. The method of claim 1, the step of permitting the shells to fall freely includes allowing the shells to free-fall through the liquid for a distance sufficient to permit the shells to reach convex-side-down positions.

4. The method of claim 1, said liquid temperature in the tank is between 72°– 80° F., said holding time to obtain a set is 5 – 15 minutes.

5. The method of claim 3, said gathering step occurring prior to the step of transferring the shells and set to the recovery area.

6. Apparatus for commercially setting large quantities of oyster larvae on oyster shells comprising bulk storage means for holding a supply of shells, gate means for dispensing a plurality of individual oyster shells from said storage means into a setting tank, a setting liquid containing free-swimming oyster larvae in said tank, means in said tank for moving the shells through the liquid, said means for moving the shells through the liquid including an open-mesh conveyor spaced below the top surface of the setting liquid a distance sufficient to allow substantially all the shells to free-fall through the liquid into convex-side-down positions on the conveyor, and means for collecting the shells in containers of easily transportable size after the larvae have set thereon, and recovering means in proximity to the setting tank for temporarily storing the collected shells.

7. The apparatus of claim 6 wherein the conveyor is on an angle and has an upper discharge end and wherein the means for collecting the shells is at the upper discharge end of the conveyor.

* * * * *